(12) United States Patent
Tamura et al.

(10) Patent No.: US 9,067,640 B2
(45) Date of Patent: Jun. 30, 2015

(54) STRADDLE TYPE VEHICLE

(71) Applicant: HONDA MOTOR CO., LTD., Tokyo (JP)

(72) Inventors: Kenji Tamura, Wako (JP); Kanae Fujitake, Wako (JP); Kenichi Misaki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/215,385

(22) Filed: Mar. 17, 2014

(65) Prior Publication Data

US 2014/0284129 A1    Sep. 25, 2014

(30) Foreign Application Priority Data

Mar. 22, 2013  (JP) ................. 2013-060486

(51) Int. Cl.
| | |
|---|---|
| *B62M 7/02* | (2006.01) |
| *B60K 11/04* | (2006.01) |
| *B62K 19/48* | (2006.01) |
| *B62J 23/00* | (2006.01) |
| *B62K 11/04* | (2006.01) |

(52) U.S. Cl.
CPC ............ *B62M 7/02* (2013.01); *B60K 11/04* (2013.01); *B62K 19/48* (2013.01); *B62J 23/00* (2013.01); *B62K 11/04* (2013.01)

(58) Field of Classification Search
CPC ........................................................ B62J 23/00

USPC ........................... 180/219; 280/304.3
See application file for complete search history.

(56) References Cited

U.S. PATENT DOCUMENTS

| | | | |
|---|---|---|---|
| 5,016,725 A * | 5/1991 | Muramatsu ................ 180/225 |
| 5,704,442 A | 1/1998 | Okazaki et al. |
| 5,887,561 A | 3/1999 | Spurgin |
| 7,637,345 B2 * | 12/2009 | Kurokawa et al. .......... 180/311 |
| 7,850,225 B2 * | 12/2010 | Nobuhira et al. .......... 296/191 |
| 2004/0118626 A1 | 6/2004 | Barnes |
| 2012/0139226 A1 * | 6/2012 | Yanagita ................. 280/851 |

FOREIGN PATENT DOCUMENTS

| | | | |
|---|---|---|---|
| JP | 7-2476 | | 1/1995 |
| JP | 08142956 A | * | 6/1996 |

* cited by examiner

*Primary Examiner* — Kevin Hurley
(74) *Attorney, Agent, or Firm* — Rankin, Hill & Clark LLP

(57) ABSTRACT

In a straddle type vehicle having a power unit provided on a body frame between a front wheel and a rear wheel to provide a driving force to the vehicle, and a radiator provided between the front wheel and the power unit to radiate the heat of the power unit into the air, a guard pipe is provided between the radiator and the power unit so as to protect the power unit from colliding with the ground when the vehicle is overturned and from being struck by obstacles in the front direction. Effective utilization of a narrow space can protect the power unit due to the fact that the guard pipe is provided in the relatively narrow space between the radiator, which is just in front of the power unit, and the power unit so as to protect the power unit.

20 Claims, 4 Drawing Sheets

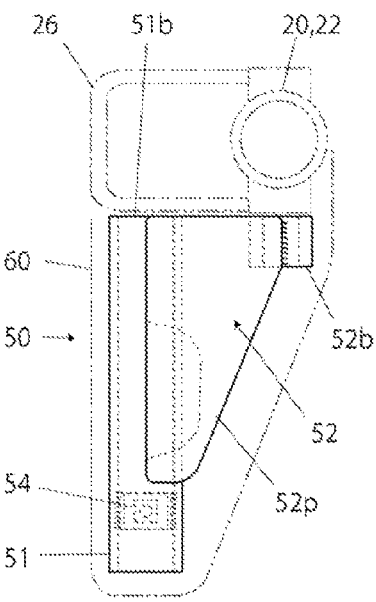
FIG. 4A
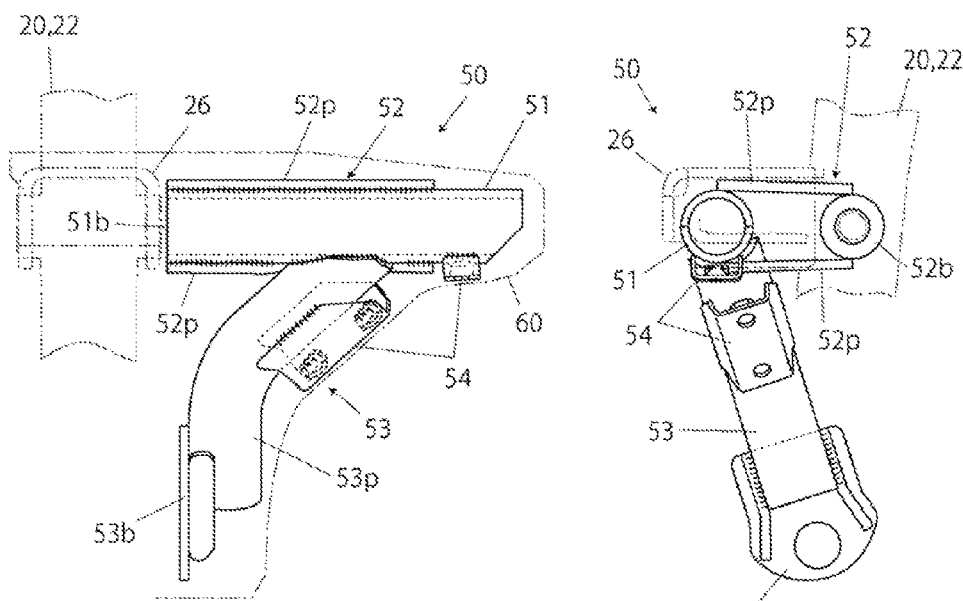
FIG. 4C
FIG. 4B

STRADDLE TYPE VEHICLE

BACKGROUND OF THE INVENTION

1. Field of the Invention

The present invention relates to a straddle type vehicle and, more particularly, toward a structure for protecting a power unit of a straddle type vehicle.

2. Description of Related Art

Conventionally, for example as shown in Japanese Examined Patent Publication Hei No. 07-72476, there is a widely known straddle type vehicle having a guard pipe (13) on the side surfaces of the vehicle so as to be long in the longitudinal direction.

SUMMARY OF THE INVENTION

In the ordinal straddle type vehicle as above mentioned, the guard pipe was provided so as to be long in the longitudinal direction, which requires a wide space for attaching the guard pipe.

The present invention aims to provide a straddle type vehicle that can effectively utilize a narrow space for protecting a power unit.

In order to solve the above-mentioned problem, in a straddle type vehicle having a power unit and a radiator, wherein the power unit is provided on a body frame between a single-wheel front wheel and one or two rear wheel(s) to provide a driving force to the vehicle, and the radiator is provided between the front wheel and the power unit to radiate the heat of the power unit into the air, a guard pipe is provided between the radiator and the power unit so as to protect the power unit from colliding with the ground when the vehicle is overturned and from being struck by obstacles in the front direction.

In further accordance with the present invention, effective utilization of a narrow space can protect the power unit due to the fact that the guard pipe is provided in the relatively narrow space between the radiator and the power unit so as to protect the power unit from contact or collision with the ground when the vehicle is overturned and from being struck by the obstacles in the front direction.

In accordance with the present invention, the straddle type vehicle may be configured such that the body frame has a down frame extending in the front direction of the power unit and obliquely downward from a head pipe to the rear direction. The down frame supports the radiator in the front or forward direction of the down frame and supports the power unit in the rear or rearward direction of the down frame. The guard pipe is attached in the vicinity of a power unit supporting portion of the down frame.

In the aforementioned configuration, the guard pipe can be attached to the high-strength part in the vicinity of an engine hanger stay and a cross member.

The straddle type vehicle can be configured such that the power unit is a V-type engine mounted such that a crank shaft is in the longitudinal direction of the vehicle, the space between right and left of cylinder heads corresponds to a maximum width portion of the power unit, and the guard pipe, which is just in front of the power unit and on the same level as the cylinder heads, extends so as to be longer than the cylinder heads in the width direction of the vehicle. In such configuration, the guard pipe provided in the immediate vicinity of the maximum width portion of the power unit can enhance the protective performance.

The straddle type vehicle can be configured such that the guard pipe is configured such that a single main pipe extending to the width direction of the vehicle is fixed on the body frame with attachment members extending to the front direction and the lower direction of the main pipe, and a load receiving portion receiving the load from an inner side end surface of the main pipe in the width direction of the vehicle is provided on the body frame. In such configuration, the guard pipe can be downsized due to the fact that the load receiving portion is provided on the body frame. Moreover, the guard pipe can be fixed with two bolts due to the fact that the load receiving portion is provided separately.

The straddle type vehicle can be configured such that the guard pipe is covered by a cover fixed on a fixing place provided on the guard pipe itself. In such a configuration, an attachment member of the cover to the body frame may be unnecessary. Moreover, the attachment members of the guard pipe to the vehicle body can be covered, which increases the design performance.

The straddle type vehicle can be configured such that the down frames are in a right and left pair, the right and left of guard pipes are attached to the right and left of down frames respectively, and the cross member connects between the right and left of down frames in the vicinity of the attachment portion of the guard pipe. In such a configuration, when the vehicle is overturned to the right side or the left side, the right and left of down frames can receive and share the load. Accordingly, the body frame can increase the strength.

BRIEF DESCRIPTION OF THE DRAWINGS

FIG. 4A-4C are views of the guard pipe, with FIG. 4A being is a plan view, FIG. 4B a front view, and FIG. 4C a side view of FIG. 4B.

DETAILED DESCRIPTION OF THE INVENTION

Hereinafter, the embodiment of the straddle type vehicle related to the present invention will be explained with reference to the drawings. In addition, same signs are used for the identical parts or corresponding parts in each drawing.

Figure 1:
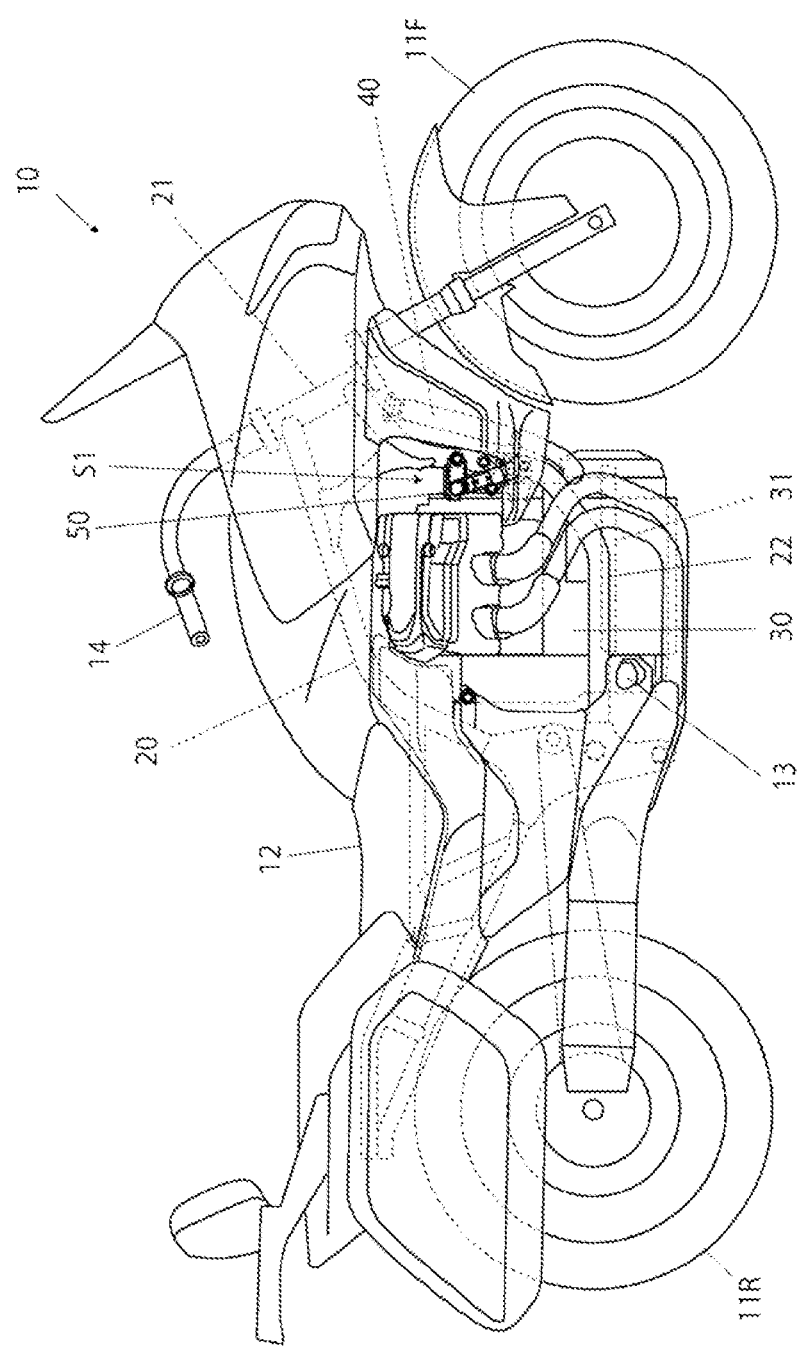
FIG. 1 is a side view of the one embodiment of the straddle type vehicle related to the present invention.

The straddle type vehicle 10 shown in FIG. 1 is a motorcycle having the power unit 30 provided on the body frame 20 between the single-wheel front wheel 11F and the rear wheel 11R which is also a single-wheel, to provide a driving force to the vehicle. The radiator 40 is provided between the front wheel 11F and the power unit 30 to radiate the heat of the power unit 30 into the air.

Figure 2:
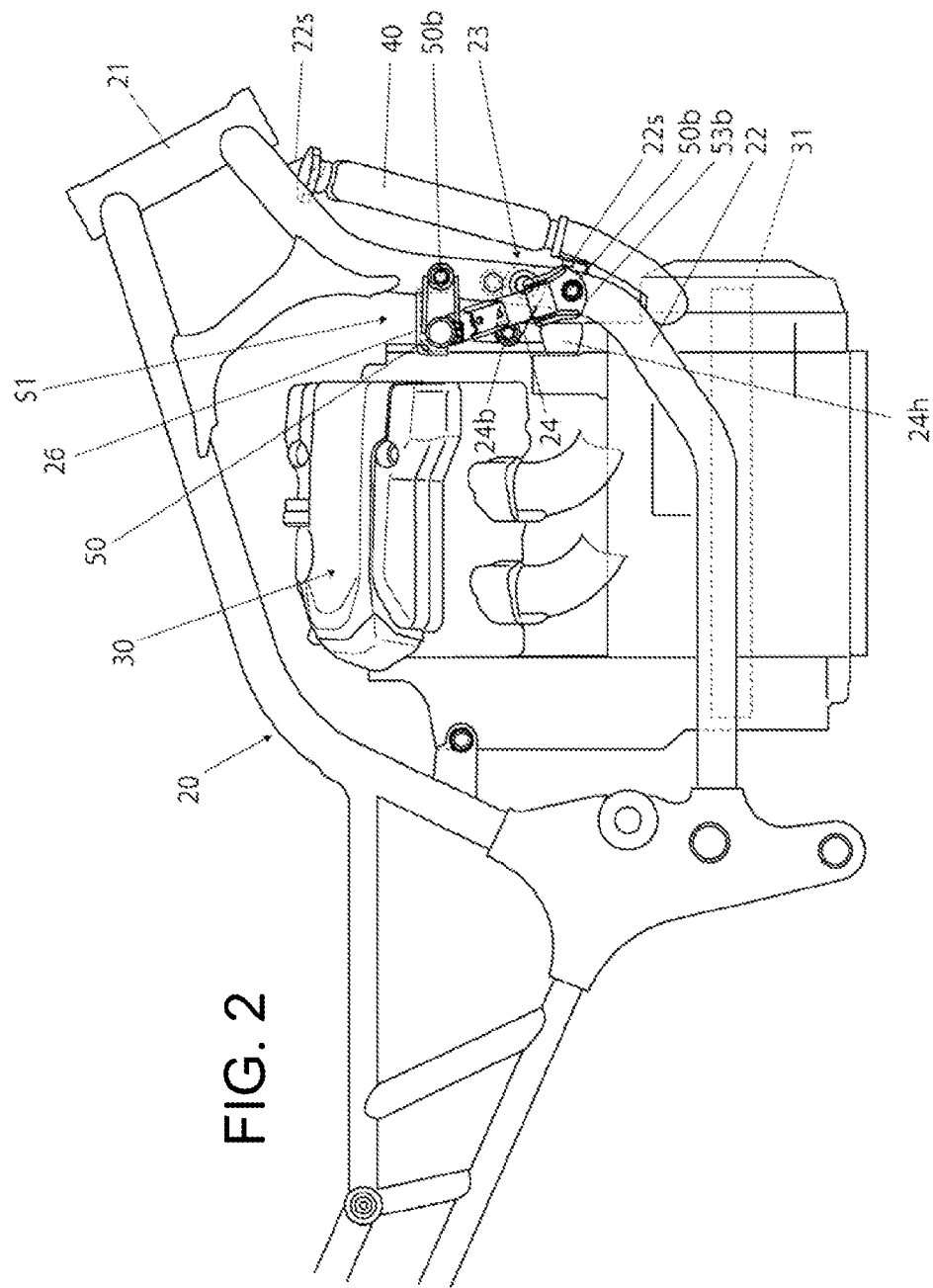
FIG. 2 is an enlarged side view showing the main parts.

A seat 12 on which the driver sits so as to straddle, is provided. Further, a step 13 on which the driver puts the feet, and a handle 14 for steering the front wheel 11F, are provided. A guard pipe 50 for protecting the power unit 30 from contact or collision with the ground when the vehicle is overturned and from the obstacles in the front direction is also provided. As shown in FIGS. 1 and 2, the guard pipe 50 is provided between the radiator 40 and the power unit 30.

According to the straddle type vehicle 10, effective utilization of the narrow space S1 can protect the power unit 30 due to the fact that the guard pipe 50 is provided in the relatively narrow space S1 between the radiator 40, which is just in front of the power unit 30, and the power unit 30 so as to protect the power unit 30 from the colliding with the ground when the vehicle is overturned and from being struck by the obstacles in the front direction.

Figure 3:
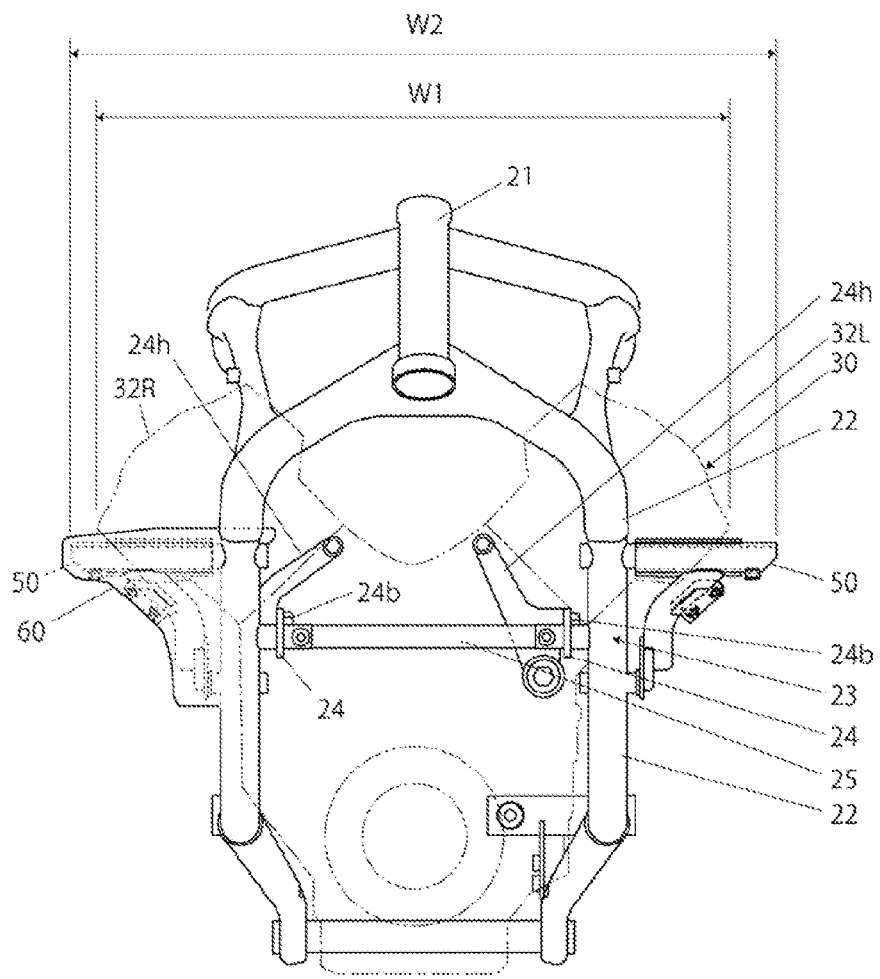
FIG. 3 is a front view which omits the parts in FIG. 2.

As shown in FIGS. 1 to 3, the body frame 20 has the right and left of down frames 22 extending in the front direction of the power unit 30 and obliquely downward from a head pipe 21 to the rear direction. The down frame 22 supports the radiator 40 in the front or forward direction of the down frame and supports the power unit 30 in the rear or rearward direction of the down frame.

The guard pipe 50 is attached to a vicinity of a power unit supporting portion 23 of the down frame 22. In such a configuration, the guard pipe 50 can be attached to the high-strength place in the vicinity of the engine hanger stay 24 and the cross member 25.

The engine hanger stay 24 is integrally provided on the down frame 22 in the power unit supporting portion 23. The power unit 30 is supported by the engine hanger 24h, fastened and fixed with bolts 24b on the engine hanger stay 24.

The cross member 25 enhances the rigidity of the power unit supporting portion 23 by connecting the right and left of the engine hanger stays 24, in other words, by connecting the down frames 22 to each other. The right and left of guard pipes 50 are attached to the right and left of down frames 22 respectively, and the cross member 25 connects between the right and left of down frames 22 in each vicinity of the attachment portion of the guard pipe 50.

In such configuration, when the vehicle is overturned to the right side or the left side, the right and left of down frames 22 can receive and share the load. Accordingly, the body frame 20 can increase the strength.

In FIG. 2, stays 22s, 22s for attaching the radiator 40 to the down frame 22 are illustrated.

The power unit 30 is a V-type engine mounted such that a crank shaft 31 is in the longitudinal direction of the vehicle, as shown in FIG. 3, the space between right and left of cylinder heads 32L, 32R corresponds to the maximum width portion W1 of the power unit 30.

The guard pipe 50, which is just in front of the power unit 30 and on the same level as the cylinder heads 32L, 32R, extends so as to be longer than the cylinder heads 32L, 32R in the width direction of the vehicle. Namely, a space W2 between the tips of the right and left of guard pipes 50 is wider than the maximum width portion W1 of the power unit 30.

In such a configuration, the guard pipe 50 provided in the immediate vicinity of the maximum width portion W1 of the power unit 30 can enhance the protective performance.

As shown in FIGS. 2 to 4C, the guard pipe 50 is configured such that the single main pipe 51 extending to the width direction of the vehicle is fixed on the body frame 20 (which is shown in the drawings as the down frame 22) with the attachment members 52, 53 extending to the front direction and the lower direction of the main pipe, and the load receiving portion 26 receiving the load from the inner side end surface 51b of the main pipe 51 in the width direction of the vehicle is provided on the body frame 20.

In such configuration, the guard pipe 50 can be downsized due to the fact that the load receiving portion 26 is provided on the body frame 20. Moreover, the guard pipe 50 can be fixed with two bolts 50b (FIG. 2) due to the fact that the load receiving portion 26 is provided separately from the guard pipe 50.

An attachment member 52 extending to the front direction of the main pipe 51 has upper and lower reinforcing plates 52p, 52p in a triangle-shape in a plane view integrally provided on the main pipe 51, and a cylindrical fixing portion 52b integrally provided on the front portion of the reinforcing plates 52p, 52p. The cylindrical fixing portion 52b is fastened and fixed on the down frame 22 with the bolt 50b (See FIG. 2).

The attachment member 53 extending to the lower direction of the main pipe 51 has a pipe 53p integrally suspended from the main pipe 51, and a fixing plate 53b integrally provided on the lower end of the pipe 53p. The fixing plate 53b is fastened and fixed with the bolt 50b on the down frame 22 (See FIG. 2).

The load receiving portion 26 is an approximately box-shaped portion integrally and firmly fixed to the down frame 22 by welding and the like. Due to the fact that the load receiving portion is abutted on the inner side end surface 51b of the main pipe 51 in the width direction of the vehicle, and the main pipe tends to move to the inner side in the width direction of the vehicle when the vehicle is overturned, the load receiving portion can receive the impact applying on the main pipe 51 and can reduce the stress concentration to the bolts 50b, 50b of the guard pipe 50.

As shown in FIGS. 3 and 4C, the guard pipe 50 is covered by the cover 60 fixed on the fixing place 54 provided on the guard pipe 50 itself.

In such a configuration, an attachment member of the cover 60 to the body frame 20 may be unnecessary. Moreover, the attachment members 52, 53 of the guard pipe 50 to the vehicle body can be covered, which increases the design performance.

In addition, FIG. 3 shows the state in which the cover 60 is attached only to the right side guard pipe 50. However, in fact, the cover 60 is also attached to the left side guard pipe 50.

As mentioned above, the embodiment of the present invention has been explained. However, the present invention will not be limited to the above-mentioned embodiment and can be appropriately modified within the summary of the present invention.

DESCRIPTION OF REFERENCE NUMERALS

10: straddle type vehicle, 20: body frame, 21: head pipe, 22: down frame, 23: power unit supporting portion, 24: engine hanger stay, 25: cross member, 26: load receiving portion, 30: power unit, 31: crank shaft, 32L, 32R: cylinder head, 40: radiator, 50: guard pipe, 51: main pipe, 52, 53: attachment member, 54: fixing place, 60: cover.

What is claimed is:

1. In a straddle type vehicle, comprising
   a power unit provided on a body frame between a single-wheel front wheel and at least one rear wheel to provide a driving force to the vehicle,
   a radiator provided between the front wheel and the power unit to radiate heat of the power unit into the air,
   a guard pipe attached to the body frame and extends to a width direction of the vehicle,
   wherein the guard pipe is provided between the radiator and the power unit so as to protect the power unit from the colliding with ground when the vehicle is overturned and from being struck by obstacles in the front direction.

2. The straddle type vehicle according to claim 1, wherein the body frame has a down frame extending in a front direction of the power unit and obliquely downward from a head pipe to the rear direction, the down frame supports the radiator in the front direction of the down frame and supports the power unit in the rear direction of the down frame, and
   the guard pipe is attached to the vicinity of a power unit supporting portion of the down frame.

3. The straddle type vehicle according to claim 1, wherein the power unit is a V-type engine mounted such that a crank shaft is in the longitudinal direction of the vehicle, the space between right and left of cylinder heads corresponds to a maximum width portion of the power unit, and wherein the guard pipe, which is just in front of the power unit and on a same level as the cylinder heads, extends so as to be longer than the cylinder heads in the width direction of the vehicle.

4. The straddle type vehicle according to claim 1, wherein the guard pipe is configured such that a single main pipe extending to the width direction of the vehicle is fixed on the body frame with attachment members extending to the front direction and the lower direction of the main pipe, and a load receiving portion receiving the load from an inner side end surface of the main pipe in the width direction of the vehicle is provided on the body frame.

5. The straddle type vehicle according to claim 1, wherein the guard pipe is covered by a cover fixed on a fixing place provided on the guard pipe.

6. The straddle type vehicle according to claim 2, wherein the down frames are in a right and left pair, the right and left of guard pipes are attached to the right and left of down frames respectively, and a cross member connects between the right and left of down frames in a vicinity of the attachment portion of the guard pipe.

7. The straddle type vehicle according to claim 2, wherein the power unit is a V-type engine mounted such that a crank shaft is in the longitudinal direction of the vehicle, the space between right and left of cylinder heads corresponds to a maximum width portion of the power unit, and
wherein the guard pipe, which is just in front of the power unit and on a same level as the cylinder heads, extends so as to be longer than the cylinder heads in the width direction of the vehicle.

8. The straddle type vehicle according to claim 2, wherein the guard pipe is configured such that a single main pipe extending to the width direction of the vehicle is fixed on the body frame with attachment members extending to the front direction and the lower direction of the main pipe, and a load receiving portion receiving the load from an inner side end surface of the main pipe in the width direction of the vehicle is provided on the body frame.

9. The straddle type vehicle according to claim 3, wherein the guard pipe is configured such that a single main pipe extending to the width direction of the vehicle is fixed on the body frame with attachment members extending to the front direction and the lower direction of the main pipe, and a load receiving portion receiving the load from an inner side end surface of the main pipe in the width direction of the vehicle is provided on the body frame.

10. The straddle type vehicle according to claim 2, wherein the guard pipe is covered by a cover fixed on a fixing place provided on the guard pipe.

11. The straddle type vehicle according to claim 3, wherein the guard pipe is covered by a cover fixed on a fixing place provided on the guard pipe.

12. The straddle type vehicle according to claim 4, wherein the guard pipe is covered by a cover fixed on a fixing place provided on the guard pipe.

13. The straddle type vehicle according to claim 3, wherein the down frames are in a right and left pair, the right and left of guard pipes are attached to the right and left of down frames respectively, and a cross member connects between the right and left of down frames in a vicinity of the attachment portion of the guard pipe.

14. The straddle type vehicle according to claim 4, wherein the down frames are in a right and left pair, the right and left of guard pipes are attached to the right and left of down frames respectively, and a cross member connects between the right and left of down frames in a vicinity of the attachment portion of the guard pipe.

15. The straddle type vehicle according to claim 5, wherein the down frames are in a right and left pair, the right and left of guard pipes are attached to the right and left of down frames respectively, and a cross member connects between the right and left of down frames in a vicinity of the attachment portion of the guard pipe.

16. The straddle type vehicle according to claim 7, wherein the down frames are in a right and left pair, the right and left of guard pipes are attached to the right and left of down frames respectively, and a cross member connects between the right and left of down frames in a vicinity of the attachment portion of the guard pipe.

17. The straddle type vehicle according to claim 8, wherein the down frames are in a right and left pair, the right and left of guard pipes are attached to the right and left of down frames respectively, and a cross member connects between the right and left of down frames in a vicinity of the attachment portion of the guard pipe.

18. The straddle type vehicle according to claim 9, wherein the down frames are in a right and left pair, the right and left of guard pipes are attached to the right and left of down frames respectively, and a cross member connects between the right and left of down frames in a vicinity of the attachment portion of the guard pipe.

19. The straddle type vehicle according to claim 10, wherein the down frames are in a right and left pair, the right and left of guard pipes are attached to the right and left of down frames respectively, and a cross member connects between the right and left of down frames in a vicinity of the attachment portion of the guard pipe.

20. The straddle type vehicle according to claim 11, wherein the down frames are in a right and left pair, the right and left of guard pipes are attached to the right and left of down frames respectively, and a cross member connects between the right and left of down frames in a vicinity of the attachment portion of the guard pipe.

* * * * *